United States Patent [19]
Nakaya et al.

[11] Patent Number: 5,767,588
[45] Date of Patent: Jun. 16, 1998

[54] WIRELESS VEHICLE CONTROL SYSTEM

[75] Inventors: Yoshimasa Nakaya, Nagoya; Minoru Yamada, Kariya; Yoshinori Katsuta, Obu; Akihiro Taguchi, Kariya, all of Japan

[73] Assignee: Nippondenso Co., Ltd., Kariya, Japan

[21] Appl. No.: 657,883

[22] Filed: Jun. 7, 1996

[30] Foreign Application Priority Data

Jun. 7, 1995 [JP] Japan ................................. 7-140211

[51] Int. Cl.⁶ ........................................................ G06F 1/24
[52] U.S. Cl. ...................... 307/10.2; 307/10.4; 180/287; 340/426; 340/825.69; 364/424.045; 395/750
[58] Field of Search ............................. 307/9.1–10.8; 180/287; 340/425.5, 426, 428, 438, 825.31, 825.69, 825.72, 539; 364/423.098, 423.099, 424.037, 424.045, 424.059, 707; 395/750

[56] References Cited

U.S. PATENT DOCUMENTS

| | | | |
|---|---|---|---|
| 4,455,623 | 6/1984 | Wesemeyer | 364/707 |
| 4,812,677 | 3/1989 | Perry | 307/10.7 |
| 4,942,393 | 7/1990 | Waraksa | 340/825.72 |
| 5,153,558 | 10/1992 | Robinson | 307/10.7 |
| 5,196,728 | 3/1993 | Jaux | 307/10.1 |
| 5,239,520 | 8/1993 | Arnold | 307/10.1 |
| 5,305,459 | 4/1994 | Rydel | 395/750 |
| 5,386,576 | 1/1995 | Chelard et al. | 395/750 |
| 5,404,544 | 4/1995 | Crayford | 395/750 |
| 5,442,341 | 8/1995 | Lambropoulos | 340/825.31 |
| 5,483,517 | 1/1996 | Kurata | 307/10.1 |

FOREIGN PATENT DOCUMENTS

| | | |
|---|---|---|
| 194915 | 9/1986 | European Pat. Off. . |
| 491095 | 6/1992 | European Pat. Off. . |
| 641138 | 3/1995 | European Pat. Off. . |
| 4201657 | 10/1992 | Germany . |
| 4300600 | 7/1994 | Germany . |
| 4309422 | 11/1994 | Germany . |

*Primary Examiner*—Richard T. Elms
*Assistant Examiner*—Peter Ganjian
*Attorney, Agent, or Firm*—Cushman Darby & Cushman IP Group of Pillsbury Madison & Sutro LLP

[57] ABSTRACT

To provide a wireless vehicle control system having a compact receiver with small current consumption, a receiver includes a receiving circuit for receiving a modulated command signal from a transmitter, a demodulation circuit for demodulating and outputting the received command signal, and a power source control circuit for starting and stopping supply of power to the receiving circuit and the demodulation circuit. A control device in the system includes a CPU for issuing to the power source control circuit a signal instructing a start of supply of power, for subsequently discriminating the control signal received from the demodulation circuit and outputting a drive signal in accordance with a discrimination result thereof, and thereafter, for issuing to the power source control circuit a signal instructing a stop of supply of power; a drive circuit for receiving the drive signal and causing a door lock motor to be operated; and a power source supply circuit for constantly supplying power to the CPU.

12 Claims, 6 Drawing Sheets

WIRELESS VEHICLE CONTROL SYSTEM

CROSS-REFERENCE TO RELATED APPLICATION

The present application is related to and claims priority from Japanese Patent Application No. Hei. 7-140211, incorporated herein by reference.

BACKGROUND OF THE INVENTION

1. Field of the Invention

The present invention relates to a wireless vehicle control system to wirelessly perform lock/unlock control of a door, or engine starting control, and so on, and more particularly, to wireless vehicle control system for which standby current of the system can be reduced.

2. Description of Related Art

Attention has been given to a wireless vehicle control system for the purpose of performing locking and unlocking of a vehicle door from a remote location, or to perform, from indoors, engine starting or air conditioner control for a vehicle located in a parking facility, and so on.

FIG. 6 and FIG. 7 indicate an example of a structure of a wireless vehicle control system according to the prior art to perform locking and unlocking of a vehicle door. FIG. 6 indicates a structure of a transmitter 3 carried by a rider in which an internal CPU 31 receives a lock instruction signal 3$a$ and unlock instruction signal 3$b$ from operation switches 36 and 37 provided on an operation panel.

The CPU 31 outputs a control code which is "01" for a door lock instruction or "10" for a door unlock instruction, and an identification code peculiar to the transmitter having a bit array of, for example, 32 bits, as a control signal 3$c$ arranged within a frame of a predetermined length (72 bits) which can be recognized by a vehicle control device which will be described later. This control signal 3$c$ is modulated by a modulation circuit 32, and is issued via a sending circuit 33 from an antenna 34 as a radio wave. Further, an operating power source is supplied to the CPU 31 and modulation circuit 32 by a power source supply circuit 35 with a built-in battery.

Structure of a receiver 1 and vehicle control device 2 disposed on the vehicle side is indicated in FIG. 7. The receiver 1 is ordinarily provided in the instrument panel, which has good receptivity to radio waves, or the like; meanwhile, the vehicle control device 2 is disposed in an open space in the vehicle body near the driver's side door or the like.

The control signal 3$c$ modulated and issued from the foregoing transmitter 3 is received by an antenna 14 of the receiver 1, passes through a receiving circuit 11, is demodulated by a demodulation circuit 12, and along with this, field strength of the received radio wave is detected by an RSSI detection circuit 15. A demodulated control signal 1$a$ and an RSSI detection signal 1$b$ are input to a CPU 17, and, in a case where sufficient field strength exists, the CPU 17 recognizes a control code in the control signal 1$a$ and outputs a lock signal 1$c$ or unlock signal 1$d$ via an output circuit 19.

The foregoing CPU 17 also receives signals 63$a$ and 64$a$ from an ignition key insertion detection switch 63 and a door open detection switch 64, and in a case where either of the two signals 63$a$ and 64$a$ exists, the CPU 17 outputs neither the lock signal 1$c$ nor the unlock signal 1$d$.

Constant operating power is supplied to the foregoing CPU 17 and an input circuit 18 from a vehicle mounted battery 4 via a power supply 16 which includes a stabilized power source circuit; meanwhile, supply of power to the receiving circuit 11, demodulation circuit 12, and RSSI circuit 15 is performed periodically via a power source control circuit 13 which operates based on a power supply start instruction signal 1$e$ output from the CPU 17 at a uniform period.

The above-described lock signal 1$c$ and unlock signal 1$d$ are received via an input circuit 24 of the vehicle control device 2 to the CPU 21. The signals 63$a$ and 64$a$ from the ignition key insertion detection switch 63 and door open detection switch 64 and signals 61$a$ and 62$a$ from a manual door lock switch 61 and a manual door unlock switch 62 are input to the CPU 21 via the input circuit 24.

The CPU 21, in accordance with the foregoing lock signal 1$c$ or unlock signal 1$d$ input thereinto, outputs a drive signal to a door lock motor 5 via an actuator drive circuit 22. The door lock motor 5 rotates normally or in reverse due to the drive signal 2$b$, and performs locking or unlocking of a lock mechanism provided in the vehicle door.

Accordingly, an operating power source is constantly supplied via a power source supply circuit 23 from the vehicle-mounted battery 4 to the foregoing CPU 21, input circuit 24, and actuator drive circuit 22.

Further, the above-described CPU 21 performs driving of the door lock motor 5 also according to the signals 61$a$ and 62$a$ from the manual door lock switch 61 and manual door unlock switch 62. Additionally, the ignition key insertion detection switch 63 and door open detection switch 64 are provided.

As an incidental comment, in the above-described wireless vehicle control system according to the prior art, the CPU 17 is disposed within the receiver 1, and there is a need to constantly supply power to this CPU 17. Current dissipation of the CPU 17 is large in comparison with other circuits, and for this reason, standby current as well as a power supply to the CPU 21 via the vehicle control device 2 become large, and there is a large load for the vehicle mounted battery during a noncharging state while the vehicle is stopped.

Additionally, device configuration becomes large because the CPU 17 and peripheral circuitry thereof are disposed within the receiver 1, and provision in an instrument panel with limited space is a difficult matter.

SUMMARY OF THE INVENTION

In light of problems such as these, it is an object of the present invention to provide a wireless vehicle control system having a compact receiver with small current consumption.

The above object is achieved according to a first aspect of the present invention by providing a wireless vehicle control system having a transmitter, a receiver and control device disposed in mutually remote positions within a vehicle, where the receiver includes a receiving circuit for receiving a modulated command signal sent from the transmitter; a demodulation circuit for demodulating and outputting the received command signal; and a power source control circuit for starting and stopping supply of power to the receiving circuit and the demodulation circuit in accordance with an external signal.

Also, the control device includes a signal discrimination circuit, realized by a single CPU, for issuing to the power source control circuit a signal instructing a start of supply of power, for subsequently discriminating the control signal received from the demodulation circuit and outputting a drive signal in accordance with a discrimination result, and thereafter, for issuing to the power source control circuit a signal instructing a stop of supply of power; a drive circuit for receiving the drive signal and causing predetermined vehicle equipment to be operated; and a power source supply circuit for constantly supplying power to the signal discrimination circuit.

In this way, the receiving circuit, demodulation circuit, and power source control circuit within the receiving circuit are each realized without using a CPU, and moreover the supply of power to the foregoing receiving circuit and demodulation circuit is performed by the power supply start instruction signal from the foregoing signal discrimination circuit only during discrimination operation in the signal discrimination circuit. Consequently, constant supply of power by the power source supply circuit is performed substantially only with respect to the signal discrimination circuit realized by a CPU within the control device.

Because of this, current consumption in a system standby state is greatly reduced. Additionally, because no need exists to provide a CPU in the receiver, the receiver is small, and can easily be installed in an instrument panel or the like.

Preferably, the receiver includes a receiving state detection circuit for detecting a receiving state of the command signal, and the signal discrimination circuit immediately issues a signal instructing the stop of supply of power in a case where a detected receiving state is poor. Thus, when a receiving state at the receiver is poor, the foregoing signal discrimination circuit immediately issues a power supply stop signal without performing discrimination of the control signal and stops supplying the power to the receiving circuit and demodulation circuit, and so wasteful power consumption can be further reduced.

Additionally, it is possible that the receiver further includes a signal output prohibition circuit for prohibiting output of a control signal from the demodulation circuit in a case where a receiving state detected by the receiving state detection circuit is poor. In this way, output of the control signal from the receiver is completely prohibited in a case where a receiving state is poor, and so the signal discrimination circuit of the control device can determine the quality of the receiving state by the presence or absence of input of the control signal, and a signal line between the receiver and control device for receiving state detection signal use becomes unnecessary.

Moreover, the signal discrimination circuit may output the drive signal in accordance with an operation signal of manual operation switches. Thus, operation of vehicle mounted equipment by manual operation switches becomes possible due to the signal discrimination circuit realized by a single CPU.

Other objects and features of the invention will appear in the course of the description thereof, which follows.

BRIEF DESCRIPTION OF THE DRAWINGS

Additional objects and advantages of the present invention will be more readily apparent from the following detailed description of preferred embodiments thereof when taken together with the accompanying drawings in which.

DETAILED DESCRIPTION OF THE PRESENTLY PREFERRED EXEMPLARY EMBODIMENTS

Figure 1:
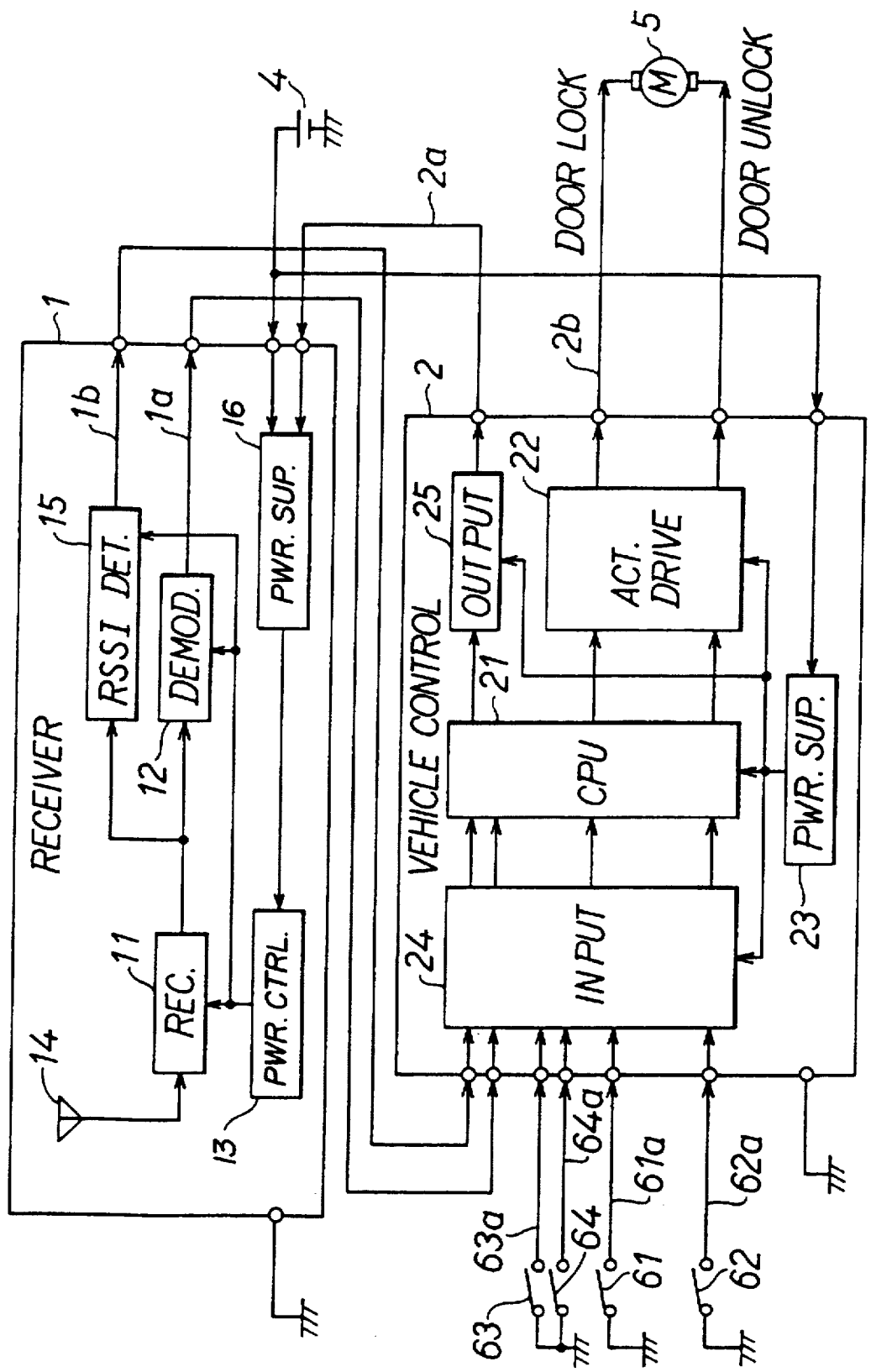
FIG. 1 is a block structural diagram of a receiver and vehicle control device according to a first embodiment of the present invention.

Embodiments of the present invention will be described hereinafter with reference to the drawings.

In a first preferred embodiment of the present invention, a command signal modulated and sent from a transmitter is received by an antenna 14 of a receiver 1, passes through a receiving circuit 11, and is demodulated by a demodulation circuit 12, and along with this, field strength of the received radio wave is detected by an RSSI detection circuit 15. A demodulated control signal 1a and an RSSI detection signal 1b are sent unchanged to a vehicle control device 2.

Operating power of a predetermined voltage is supplied to the above-described receiving circuit 11, RSSI detection circuit 15, and demodulation circuit 12 from a power source supply circuit 16, and starting of supply of power from the power source supply circuit 16 and stopping thereof are controlled by a power source control circuit 13. The power source control circuit 13 issues a control signal to the power source supply circuit 16 based on a signal 2a for power supply starting or power supply stopping from a vehicle control device which will be described later. The power source control circuit 13 is directly connected to a vehicle-mounted battery 4 and receives supply of power, but power consumption thereof is extremely small in comparison with a CPU which will be described later.

A CPU 21 is provided in the vehicle control device 2, and takes in the control signal 1a and RSSI detection signal 1b received via an input circuit 24 from the above-described receiver 1. As will be described in detail later, the CPU 21 discriminates a control code in the control signal 1a in a case where sufficient RF field strength exists, and outputs a lock or unlock drive signal 2b, in accordance with the determination result, to a door lock motor 5 via an actuator drive circuit 22.

Additionally, as will be described later, the CPU 21 outputs to the power source control circuit 13 of the receiver 1 via an output circuit 25 a high-level power supply start instruction signal 2a according to the present embodiment. When the signal 2a is at a low level, it becomes a signal for power supply stopping 2a as described above. Signals 61a and 62a from a manual door lock switch 61 and a manual door unlock switch 62 are input to the CPU 21 via an input circuit 24, and driving of the door lock motor 5 is performed also according to these signals 61a and 62a.

The CPU 21 further also receives signals 63a and 64a from an ignition key insertion detection switch 63 and a door open detection switch 64, and it is also possible to execute control not to perform driving of the door lock motor 5 by the CPU 21 in a case where these signals 63a and 64a exist.

Further, CPU 21 is provided with a hardware timer in which an RC circuit (not shown) is used to wake the CPU up from a sleep condition.

Further, a power source is constantly supplied to the above-described CPU 21, input circuit 24, output circuit 25, and actuator drive circuit 22 from the vehicle mounted battery 4 via a power source supply circuit 23, but current consumption thereof is predominantly by the CPU 21.

Figure 2:
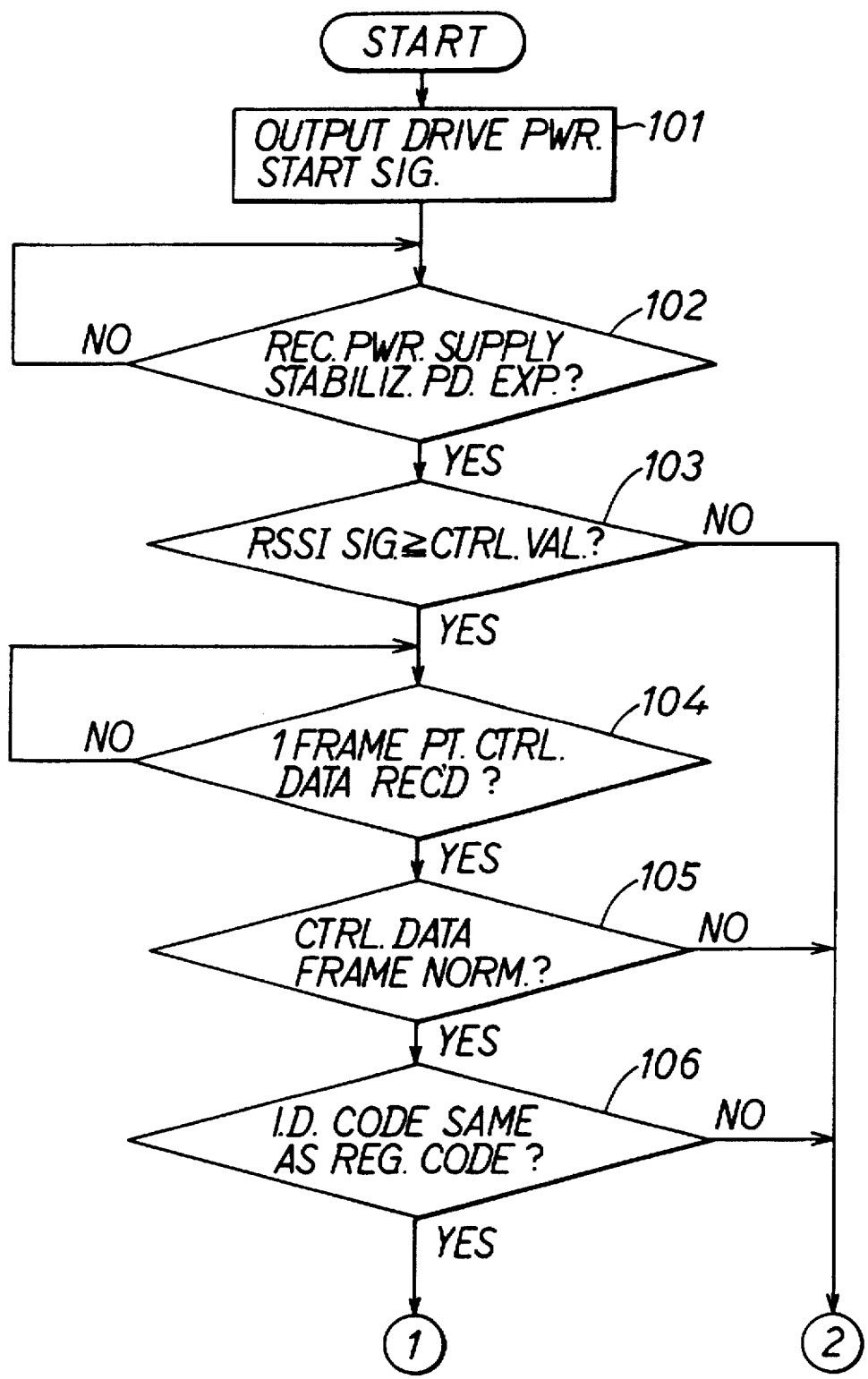
FIG. 2 is a flowchart indicating a processing sequence of a vehicle control device CPU according to the first embodiment of the present invention.
Figure 3:
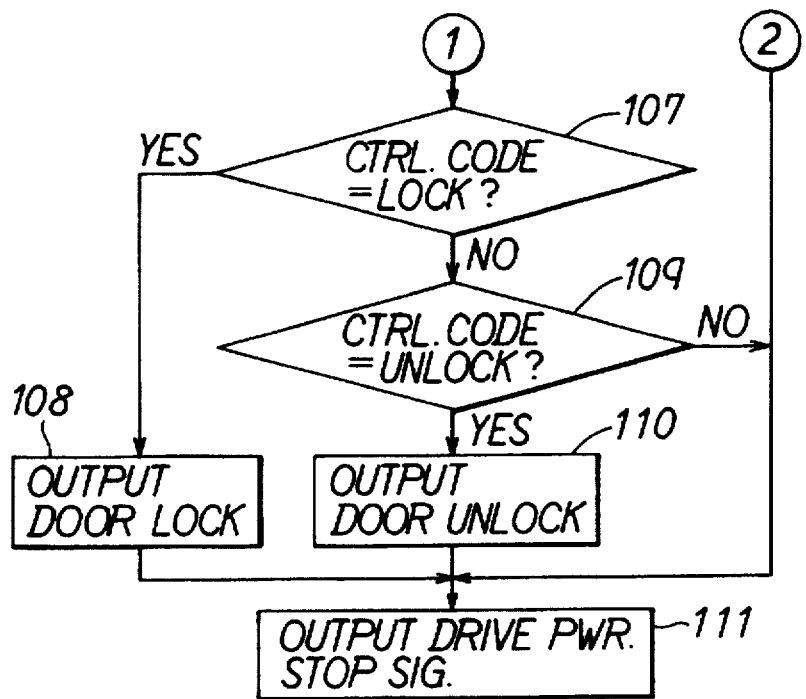
FIG. 3 is a flowchart indicating the processing sequence of the vehicle control device CPU according to the first embodiment of the present invention.
Figure 6:
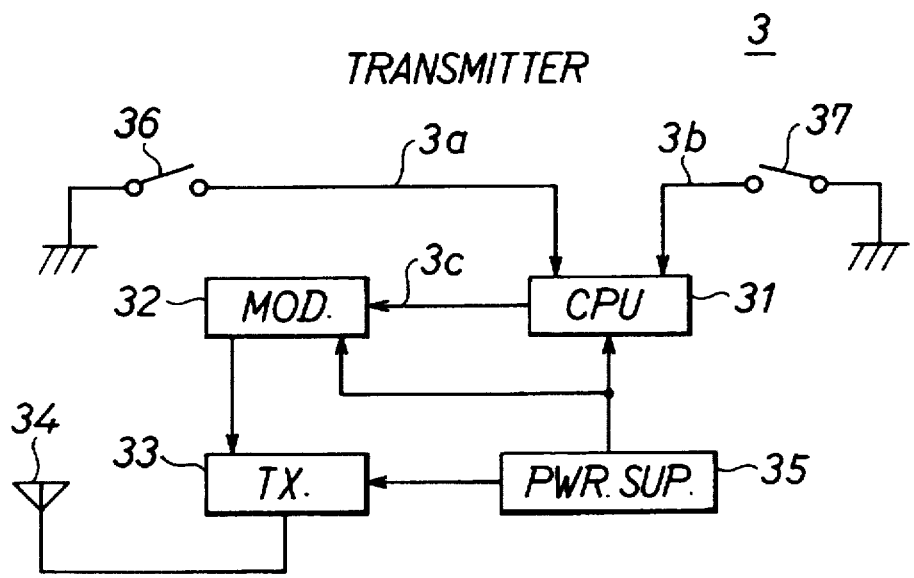
FIG. 6 is a block structural diagram of a transmitter according to the prior art.

FIGS. 2 and 3 indicate a processing sequence of the foregoing CPU 21 in a case where locking/unlocking of a door are performed wirelessly. In the drawings, the CPU 21, when awakened from a sleep state by an output of the RC timer, in step 101 outputs power supply start instruction signal 2a to the power source control circuit 13 of the receiver 1. The power source control circuit 13 which has received the power supply start instruction signal 2a starts to supply power to the receiving circuit 11 and the like from the power source supply circuit 16.

In step 102, stabilization of the power source of the receiver 1 is awaited, and in step 103 it is confirmed that the RSSI signal 1b is a uniform specified value or more, i.e., that the field strength of the received radio wave is sufficient.

In a case where received radio wave field strength is sufficient, in step 104, a portion of control signal 1a data from the receiver 1 corresponding to one frame is taken in, and it is confirmed whether the frame of the control signal 1a data is correct in step 105. In step 106, it is confirmed whether a transmitter discrimination code in the data frame matches a priorly registered item.

In a case where the foregoing discrimination code matches, in steps 107 and 109 it is discriminated whether the control code in the data frame is for door locking or door unlocking, and in accordance with the discrimination result, the drive signal 2b for door locking or door unlocking is output in steps 108 and 110.

After the drive signal 2b has been output, in step 111 the power supply stop instruction signal 2a is output to the power source control circuit 13 of the receiver 1, and the supply of power to the receiving circuit 11 and the like is terminated. The CPU 21 which has ended processing thereafter returns to the sleep mode.

Moreover, in a case where the determination of the above-described steps 103, 105, or 106 is negative, in step 111 the power supply stop instruction signal 2a is immediately issued and the CPU 21 promptly returns to the sleep mode.

As was described above, the elements constantly supplied with a power source from the vehicle-mounted battery 4 are the CPU 21, input circuit 24, output circuit 25, and actuator drive circuit 22 of the vehicle control device 2, and the power source control circuit 13 of the receiver 1; among these, the CPU 21, for which power consumption is overwhelmingly large during standby, is provided only singly in the vehicle control device 2, and so the load of the vehicle-mounted battery 4 becomes sufficiently small. In particular, according to the present embodiment, the CPU 21 is normally caused to be in the sleep mode, for which power consumption is relatively small, and so power consumption during standby can be further reduced.

Additionally, because a CPU and peripheral circuitry thereof are not provided in the receiver 1, device configuration is compact, and the device can easily be installed in an instrument panel or the like.

Figure 4:
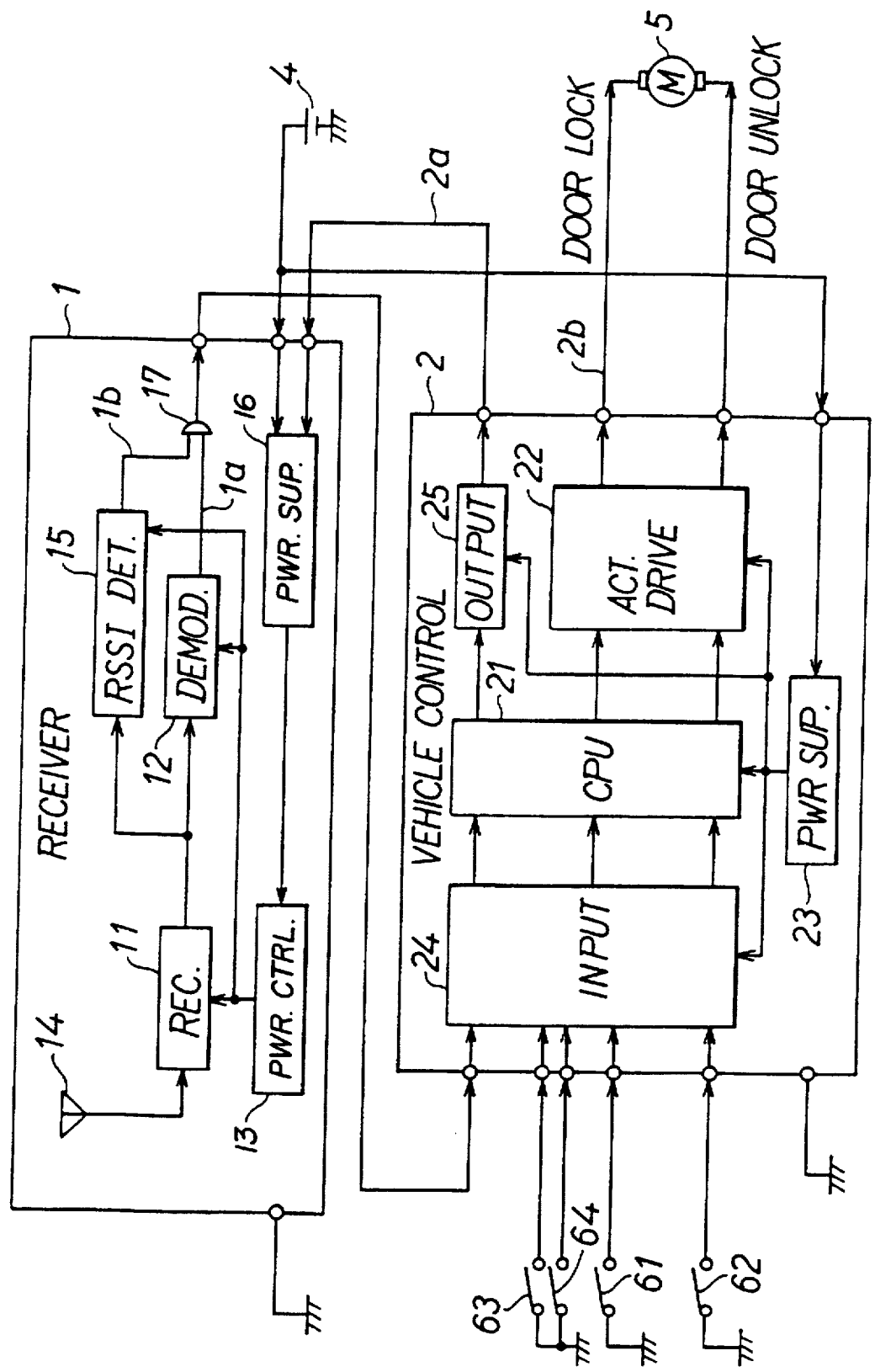
FIG. 4 is a block structural diagram of a receiver and vehicle control device according to a second embodiment of the present invention.

As shown in FIG. 4, in a second preferred embodiment of the present invention, if an AND gate 17 is provided in a later stage of the demodulation circuit 12 of the receiver 1 and this gate 17 is switched by the output signal 1b of the RSSI detection circuit 15, the control signal 1a is not sent to the vehicle control device 2 and lock/unlock control of the door is not performed in a case where field strength of the received radio signal is small.

According to the second embodiment, signal lines from the receiver 1 to the vehicle control device 2 can be made to be fewer than in the first embodiment, and a wire harness used for the device becomes compact.

Further, if the foregoing control signal 1a is utilized as an interrupt signal to the CPU 21, the CPU 21 can be dedicated to control other than receiving control in a case where field strength of the received radio wave is small.

Figure 5:
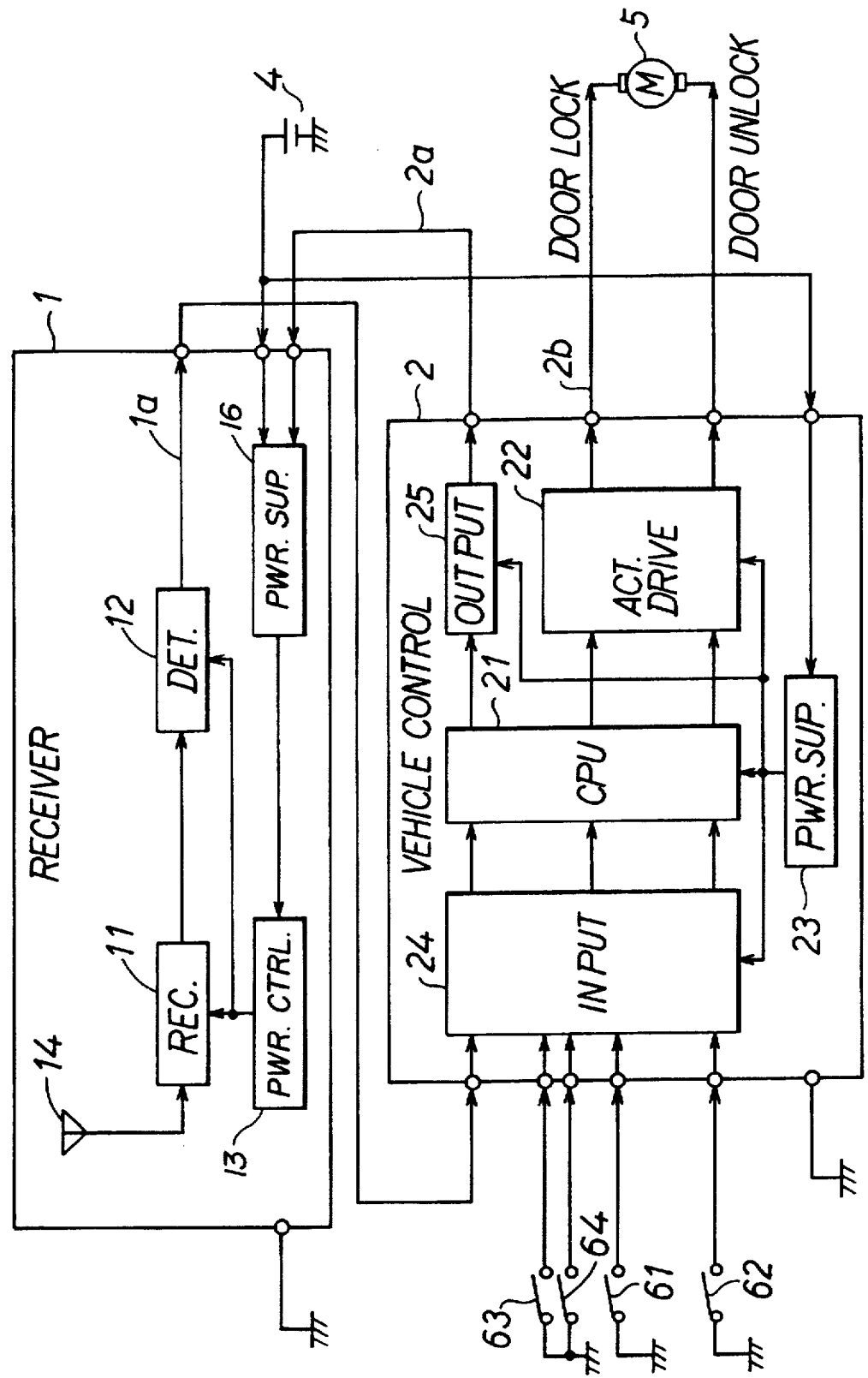
FIG. 5 is a block structural diagram of a receiver and vehicle control device according to a third embodiment of the present invention.
Figure 7:
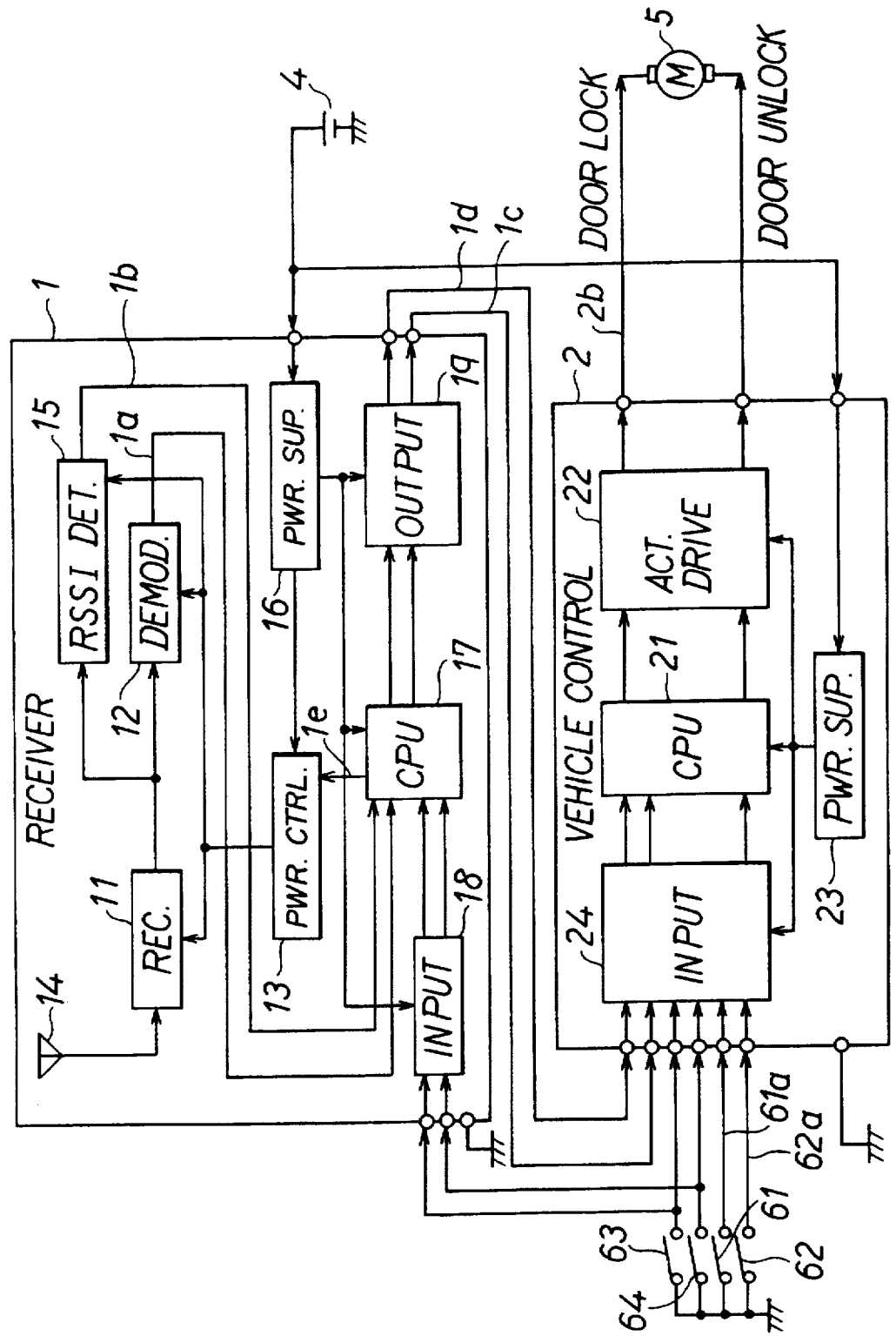
FIG. 7 is a block structural diagram of a receiver and vehicle control device according to the prior art.

As shown in FIG. 5, in a third preferred embodiment of the present invention, the RSSI detection circuit of the receiver 1 can also be omitted. In this case, the CPU 21 always takes in a portion of control signal 1a data corresponding to one frame, and although it is necessary to perform a determination as to whether the frame is correct (steps 104 and 105 in FIG. 2), circuit structure of the receiver 1 is further simplified, and compactness is enhanced.

Moreover, according to the above-described several embodiments, propagation of a wireless signal was performed by radio waves, but light, sound waves, or the like can be utilized as a substitute for radio waves, and in this case it is possible to perform accommodation promptly merely by changing the receiver. Additionally, various modulation methods such as amplitude modulation, frequency modulation, phase modulation, or the like can be employed as the modulation method of the modulation circuit as well.

Also, although the CPU 21 generates a signal to the power source control circuit 13 of the receiver 1 every time the CPU 21 wakes up, the CPU 21 can generate the signal every plurality of times the CPU 21 wakes up. Further, the CPU 21 need not be implemented using a microprocessor but may alternatively be implemented as a programmed logic array (PLA) or the like.

Although the present invention has been fully described in connection with the preferred embodiment thereof with reference to the accompanying drawings, it is to be noted that various changes and modifications will become apparent to those skilled in the art. Such changes and modifications are to be understood as being included within the scope of the present invention as defined by the appended claims.

What is claimed is:

1. A wireless vehicle control system comprising:
   a receiver having no central processing unit but including
     a receiving circuit for receiving a control signal sent from a transmitter carried by a rider;
     a demodulator for demodulating said control signal received by said receiving circuit to provide a demodulated control signal; and
     a power source control circuit for selectively starting and stopping supply of power to said receiving circuit responsive to an instruction signal; and
   a control device disposed in said vehicle remote from said receiver, said control device including
     a signal discrimination circuit for outputting to said power source control circuit an instruction signal indicative of said starting of supply of power at every predetermined timing, and for subsequently inputting said control signal from said receiver, for discriminating said demodulated control signal, for outputting a drive signal in accordance with a discrimination result, and for outputting to said power source control circuit said instruction signal indicative of said stopping supply of power;

a driver circuit for inputting said drive signal and causing vehicle equipment to operate; and a power source supply circuit for constantly supplying power to said signal discrimination circuit.

2. A wireless vehicle control system according to claim 1, wherein said control signal sent from said transmitter is a radio wave.

3. A wireless vehicle control system according to claim 2, wherein said receiver further includes a receiving state detection circuit for detecting field strength of said control signal sent from said transmitter.

4. A wireless vehicle control system according to claim 3, wherein said signal discrimination circuit is for inputting a detected value of field strength from said receiving state detection circuit, and for outputting to said power source control circuit a signal to stop supply of power when said detected value is a specified value or less.

5. A wireless vehicle control system according to claim 3, said receiving device further including control signal inhibiting means for, responsive to said signal from said receiving state detection circuit, inhibiting provision of said control signal to said control device.

6. A wireless vehicle control system according to claim 5, wherein said control signal inhibiting means is an AND logic gate.

7. A wireless vehicle control system according to claim 1, further comprising:

a manual operation switch generating an operation signal when actuated;

wherein said signal discrimination circuit is for outputting said drive signal responsive to said operation signal.

8. A wireless vehicle control system according to claim 7, further comprising:

a vehicle status switch generating a status signal representative of a status of said vehicle;

wherein said signal discrimination circuit is for inhibiting operation of said drive signal responsive to said status signal.

9. A wireless vehicle control system according to claim 1, further comprising:

a vehicle status switch generating a status signal representative of a status of said vehicle;

wherein said signal discrimination circuit is for inhibiting operation of said drive signal responsive to said status signal.

10. A wireless vehicle control system according to claim 1, wherein said vehicle equipment is a door lock device.

11. A wireless vehicle control system according to claim 1, wherein:

said transmitter further includes a modulator for modulating said control signal; and said receiver further includes a demodulator for demodulating said control signal.

12. A wireless vehicle control system according to claim 1, wherein said signal discrimination circuit is implemented using a single CPU.

* * * * *